No. 620,036. Patented Feb. 21, 1899.
J. W. JENKINS.
MULTIPLYING CAMERA.
(Application filed Dec. 1, 1898.)

(No Model.)

Witnesses
Lorn Prentiss
Ernest D. Wilcox

John Wilson Jenkins, Inventor
By his Attorney

THE NORRIS PETERS CO., PHOTO-LITHO., WASHINGTON, D. C.

UNITED STATES PATENT OFFICE.

JOHN WILSON JENKINS, OF DANVILLE, ILLINOIS, ASSIGNOR OF ONE-HALF TO EVAN L. JENKINS, OF SAME PLACE.

MULTIPLYING-CAMERA.

SPECIFICATION forming part of Letters Patent No. 620,036, dated February 21, 1899.

Application filed December 1, 1898. Serial No. 697,988. (No model.)

*To all whom it may concern:*

Be it known that I, JOHN WILSON JENKINS, a citizen of the United States, residing at Danville, in the county of Vermilion and State of Illinois, have invented certain new and useful Improvements in Photograph-Cameras; and I do hereby declare the following to be a full, clear, and exact description of the invention, such as will enable others skilled in the art to which it appertains to make and use the same.

My invention relates to improvements in so-called "multiphotographic cameras;" and it consists in the construction, combination, and arrangement of parts designed to facilitate the manipulation of the camera, increase its efficiency, and improve the character of the work, all as hereinafter fully described, and specifically pointed out in the claims.

Figure 1:
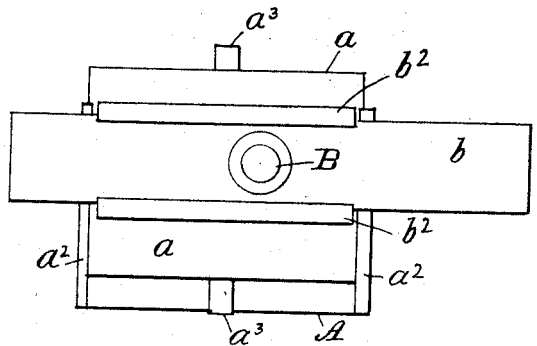
Figure 4:
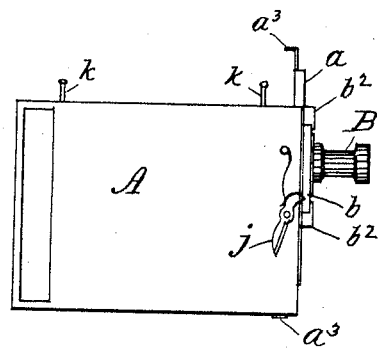
Figure 2:
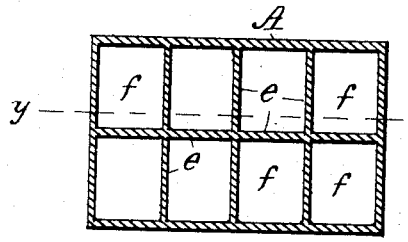
Figure 5:
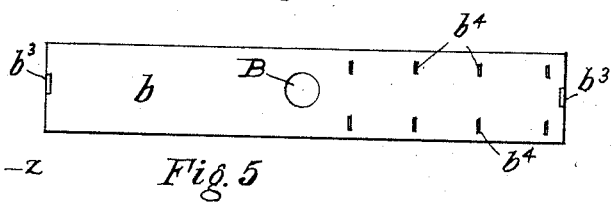
Figure 6:
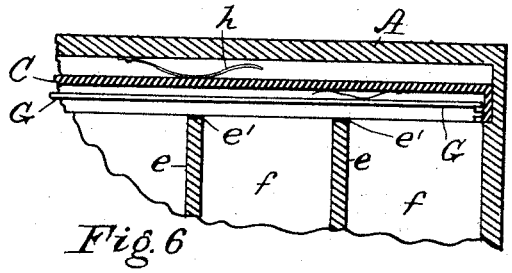
Figure 3:
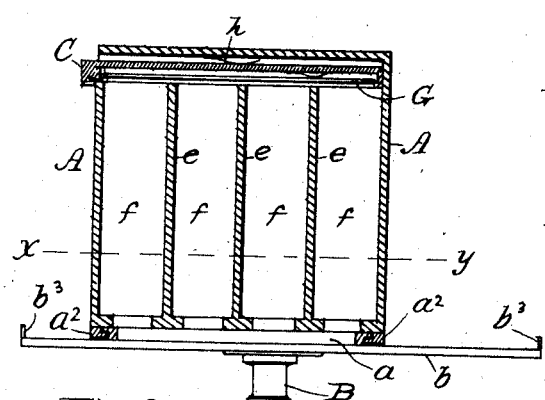
Figure 7:
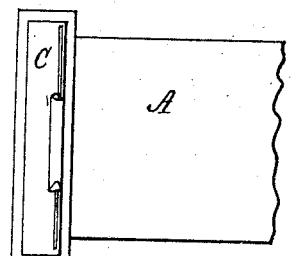

In the drawings, Figure 1 is a front view in elevation of a camera so constructed as to embrace my invention. Fig. 2 represents a transverse vertical section through the same, taken on the line $x\,y$ of Fig. 3. Fig. 3 represents a horizontal section through the camera, taken on the line $y\,z$ of Fig. 2. Fig. 4 is a side elevation of the camera. Fig. 5 is a view in elevation of the back of the lens-carrying slide. Fig. 6 is a partial sectional view showing, on a larger scale, the structural details of some of the parts; and Fig. 7 is a detail illustrating a modified or alternative construction of the camera-box.

In general terms my invention comprises a camera designed to permit the taking of a number of views successively upon a single plate at any desired interval of time and with greater uniformity and much less manipulation than has before been possible. In the drawings I have shown a camera designed to take eight exposures on one plate, but it must be understood that it may be constructed to take twelve, sixteen, twenty-four, or any desired number, according to my invention.

Referring to the drawings, A represents the camera-box, which may be supported on a tripod in the usual way or carried in the hand like a kodak-camera.

B represents the lens of any suitable kind, but preferably one possessing what is known as "focal depth," so that it admits of some variation in the length of anterior focus without perceptibly losing sharpness of the image on the plate, although uniformity in the distance from the object to the lens is desirable and preferable.

C represents the plate-holder, which, as shown, slides into the back of the camera, but a roll-holder or film-carrier could of course be used instead of a plate-holder, if preferred.

The lens B is mounted in a slide $b$, which slides in guides $b^2$ on the sliding front board $a$ of the camera, which front board slides in guides $a^2$ on the camera-box. Stops $b^3$ may be used to prevent any possibility of the slide $b$ being drawn entirely out of its guides by accident or meddlesomeness, and thus spoiling one row of exposures, and stops $a^3$ on the front board are provided to cause the lens to register with a given row of the cells through which the exposures are to be made.

The camera-box A is constructed with partitions $e$, extending its entire depth and dividing it into cells $f$ of the desired number. The back edge $e'$ of these partitions is faced with some elastic light-excluding material—such as felt, velvet, &c.—against which the plate-holder C or the film, if one is used, is tightly pressed by the springs $h$ back of the plate-holder. The plate-holder may be constructed with very thin guides for the slide, and the ledge against which the plate bears also made thin, so that the plate, which is pressed forward by springs or kept up against its ledge by any of the well-known means, is almost in actual contact with the rear ends of the partitions $e$, and thus any diffusion of light from the part of the plate that is exposed is prevented. All of the interior parts of the camera, plate-holder, &c., are blackened or otherwise made non-reflective, as is universally done with all cameras. If deemed necessary, it is obvious that the camera-box A might be constructed somewhat larger at its back end, as shown in Fig. 7, and a plate-holder used, which when forced forward by the spring $h$ will allow the plate G to come into actual contact with the partitions $e$, and thus absolutely exclude all possibility of any reflection or diffusion from one cell into another or upon any other portion of the plate.

To register the lens B with the center of the cells $f$ as the slide $b$ is moved, notches $b^4$ are formed in the slide at the proper points, and a spring-actuated dog $j$ is arranged to fall into one of the notches as the slide is moved to a position which brings the lens in correct register with any one of the cells $f$. This locks the slide in proper position and prevents its displacement by jarring, &c. For convenience the notches $b^4$ may be beveled on one side, if preferred, so that the slide $b$ can be pushed in one direction past the dog, but cannot be pushed past it in the other direction. This is sometimes convenient where it is desired to make two or more exposures in quick succession without taking time to release the dog by hand.

To locate the object central to the field of the lens, marks or pins $k$ may be arranged on the top of the camera-box by means of which the object may be "sighted" after the manner of sighting a gun. Inasmuch as the focus is fixed this dispenses with the necessity for a "finder" and makes the operation of the camera quicker than by any other means. Any form of shutter may of course be used in making the exposure as with any camera.

In operating the camera the plate-holder is inserted, and when ready to begin work the slide is drawn out, leaving the entire plate exposed to the light-tight interior of the camera. The slide $b$ has previously been drawn to one side and the front board $a$ set to register the lens with one of the horizontal rows of cells, so that the first exposure will be made on one corner of the plate. The subject having been located at the proper distance and sighted, the exposure is made by removing the cap from the lens or by means of the shutter, if one is used, and as soon as the lens is capped or the shutter closed the slide $b$ is moved to the next notch and is then ready for the second exposure. When one horizontal row of exposures has been made, the front board $a$ is set to the next row, and these are successively exposed in the same way. When all the exposures have been made, the slide of the plate-holder is inserted and the plate-holder reversed, if a double holder is used, or replaced by another holder and plate, and the exposed plate is developed in the usual way.

Among the advantages of my improved camera are these: It is simpler and cheaper than other instruments capable of producing an equal grade of work; it can be used successfully by more inexperienced persons than any camera of equal capability in the grade of work; no focusing-cloth or ground glass is required; no finder is necessary; once drawing the slide suffices for all of the exposures, making less manipulation necessary; all the exposures being made by the same lens at the same distance, the negative is more uniform, its development easier, and the printing therefrom easier and better; the work can be done more rapidly, and there is no possibility of the instrument losing or changing its focus by a fall or jar. For such work as is commonly called "kidnapping"—that is, taking pictures of children on the streets or while at play—and for similar work this instrument is especially adapted.

What I claim as my invention, and desire to secure by Letters Patent, is—

1. In a photographic camera the combination of a cellular box, a plate-holder seating against and closing the rear end of the cells, a sliding front closing the front end of the cells and having stops by which it may be fixed in relation to a particular set of cells, a lens-carrying slide moving in guides on the sliding front, and means for adjusting the slide to register the lens with each cell of the set with which the front is in relation, whereby a separate exposure may be made in each cell of the box without moving the plate and with but once drawing the plate-holder slide, substantially as described.

2. In a photographic camera the combination of a cellular box, a plate-holder seating against and closing the rear end of the cells, a sliding front closing the front end of the cells and having stops by which it may be fixed in relation to a particular set of cells, a lens-carrying slide moving in guides on the sliding front, and a spring-actuated detent engaging notches in said lens-carrying slide and holding it in register with a cell of the camera-box, substantially as and for the purpose set forth.

3. In a photographic camera the combination of a cellular box, a plate-holder seating against and closing the rear end of the cells, a sliding front closing the front end of the cells and having stops by which it may be fixed in relation to a particular set of cells, a lens-carrying slide seated in guides on the sliding front and moving at an angle to the movement thereof, and a spring-actuated detent engaging notches in said lens-carrying slide and holding it in register with a cell of the camera-box, substantially as and for the purpose set forth.

4. In a photographic camera the combination of a cellular box, a plate-holder seating against and closing the rear end of the cells, a sliding front closing the front end of the cells and having stops by which it may be fixed in relation to a particular set of cells, a lens-carrying slide moving in guides on the sliding front, sighting-pins on the camera-box, and a spring-actuated detent engaging notches in said lens-carrying slide and holding it in register with a cell of the camera-box, substantially as and for the purposes set forth.

In testimony whereof I hereto affix my signature in presence of two witnesses.

JOHN WILSON JENKINS.

Witnesses:
HARRIET R. JENKINS,
Mrs. WILLIAM S. DILLON.